US007680482B2

(12) United States Patent
Bhatt et al.

(10) Patent No.: US 7,680,482 B2
(45) Date of Patent: Mar. 16, 2010

(54) METHOD AND APPARATUS FOR SESSION TRACING AND SESSION LOGGING IN A PEER-TO-PEER COMMUNICATION ENVIRONMENT

(75) Inventors: Yogesh B Bhatt, Schaumburg, IL (US); Sunil H Madhani, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 603 days.

(21) Appl. No.: 11/457,352

(22) Filed: Jul. 13, 2006

(65) Prior Publication Data

US 2008/0013546 A1 Jan. 17, 2008

(51) Int. Cl.
*H04M 11/00* (2006.01)
(52) U.S. Cl. ............... 455/406; 455/407; 455/405; 379/114.01; 709/227; 370/352
(58) Field of Classification Search ............ 455/406, 455/405, 407; 379/114.01; 709/227; 370/352
See application file for complete search history.

(56) References Cited

U.S. PATENT DOCUMENTS

| 6,556,818 | B1 * | 4/2003 | Meehan ............... 455/406 |
| 7,092,696 | B1 * | 8/2006 | Hosain et al. ......... 455/405 |
| 7,245,609 | B2 * | 7/2007 | D'Eletto ............... 370/352 |
| 2002/0026515 | A1 * | 2/2002 | Michielsens et al. ... 709/227 |
| 2002/0150110 | A1 | 10/2002 | Inbar et al. |
| 2004/0170260 | A1 * | 9/2004 | Baker ................. 379/114.01 |
| 2004/0170261 | A1 * | 9/2004 | Baker ................. 379/114.01 |
| 2004/0203750 | A1 * | 10/2004 | Cowdrey et al. ...... 455/432.1 |
| 2005/0031097 | A1 * | 2/2005 | Rabenko et al. ...... 379/93.31 |
| 2005/0094623 | A1 | 5/2005 | D'Eletto |
| 2007/0041545 | A1 * | 2/2007 | Gainsboro ........... 379/188 |

FOREIGN PATENT DOCUMENTS

| GB | 2419256 A | 4/2006 |
| WO | 2006016332 A | 2/2006 |

OTHER PUBLICATIONS

Lee, Helal, Desai, Verma & Arslan, Konark: A System and Protocols for Device Independent, Peer-to-Peer Discovery and Delivery of Mobile Services, IEEE Transactions on Systems, Man, and Cybernetics-Part A: Systems and Humans, vol. 33, No. 6, pp. 682-696 (Nov. 2003).

* cited by examiner

*Primary Examiner*—Danh C Le
(74) *Attorney, Agent, or Firm*—Joseph T. Cygan

(57) ABSTRACT

Peer-A (101) broadcasts a Peer Lookup Query (107) to a Peer Discovery Service (PDS) (105). Peer-A (101) may receive a Peer Lookup Response (109) from any peer having the reachability information including a Time Stamp, and an Initial Sequence Number. Peer-A (101) may subsequently use the Time Stamp and Sequence Number to send session management and session media packets to Peer-B (103). Peer-A (101) and Peer-B (103) reciprocally store message identification including sequence number and timestamp in a local session record contained in a secure memory. At completion of the IP session, both Peer-A (101) and Peer-B (103) will dump the session records from their respective secure memories to a remote Session Log Database (115), via message (117) and message (119), respectively. The remote session DB consolidates the records and uses the temporal and causal relationships between the messages to resolve any data conflicts and recreate the complete session record.

15 Claims, 7 Drawing Sheets

METHOD AND APPARATUS FOR SESSION TRACING AND SESSION LOGGING IN A PEER-TO-PEER COMMUNICATION ENVIRONMENT

CROSS-REFERENCE TO RELATED APPLICATIONS

The present application is related to: U.S. patent application Ser. No. 11/265,447 (Filing Date Nov. 2, 2005) "PEER-TO-PEER COMMUNICATION ARCHITECTURE AND TERMINALS," which is assigned to the same assignee as the present application, and which is hereby incorporated by reference herein.

FIELD OF THE DISCLOSURE

The present disclosure relates generally to Internet Protocol peer-to-peer communications systems, and more particularly to peer session records in peer-to-peer Internet Protocol communications systems.

BACKGROUND

Peer-to peer wireless Internet Protocol (IP) networks provide mobile peer devices with the capability to discover and utilize various services provided by other peer devices directly including, but not limited to, telephony services similar to those provided by traditional wireless networks such as cellular or land line providers such as the Public Switched Telephone Network (PSTN). While a service provider may provide overall access to the services over for example, a wireless network infrastructure, functions such as call control are handled by the mobile peer itself and thus there is no need for a traditional switch in such networks.

Unlike peer-to-peer IP networks, cellular networks and PSTNs employ switches, such as a Mobile Switching Centers (MSC) or otherwise some type of network server that acts to establish calls, or other types of network service connections between mobile and/or fixed devices. Billing records, such as Call Detail Records (CDRs) are generated, updated and maintained via the switch or some combination of billing servers along with data produced or received by the switch. Because peer-to-peer IP networking by definition does not require the centrality of a switch or centralized server, there is no inherent billing capability.

Further, basic regulatory requirements for services such as telephony require basic information capture such as, but not limited to; caller-ID, called number, call duration, calling time of day, caller and called party locations, etc., in other words, basic call-logging and call-tracing information, or with respect to IP services, session-logging and session-tracing.

DETAILED DESCRIPTION

Figure 1:
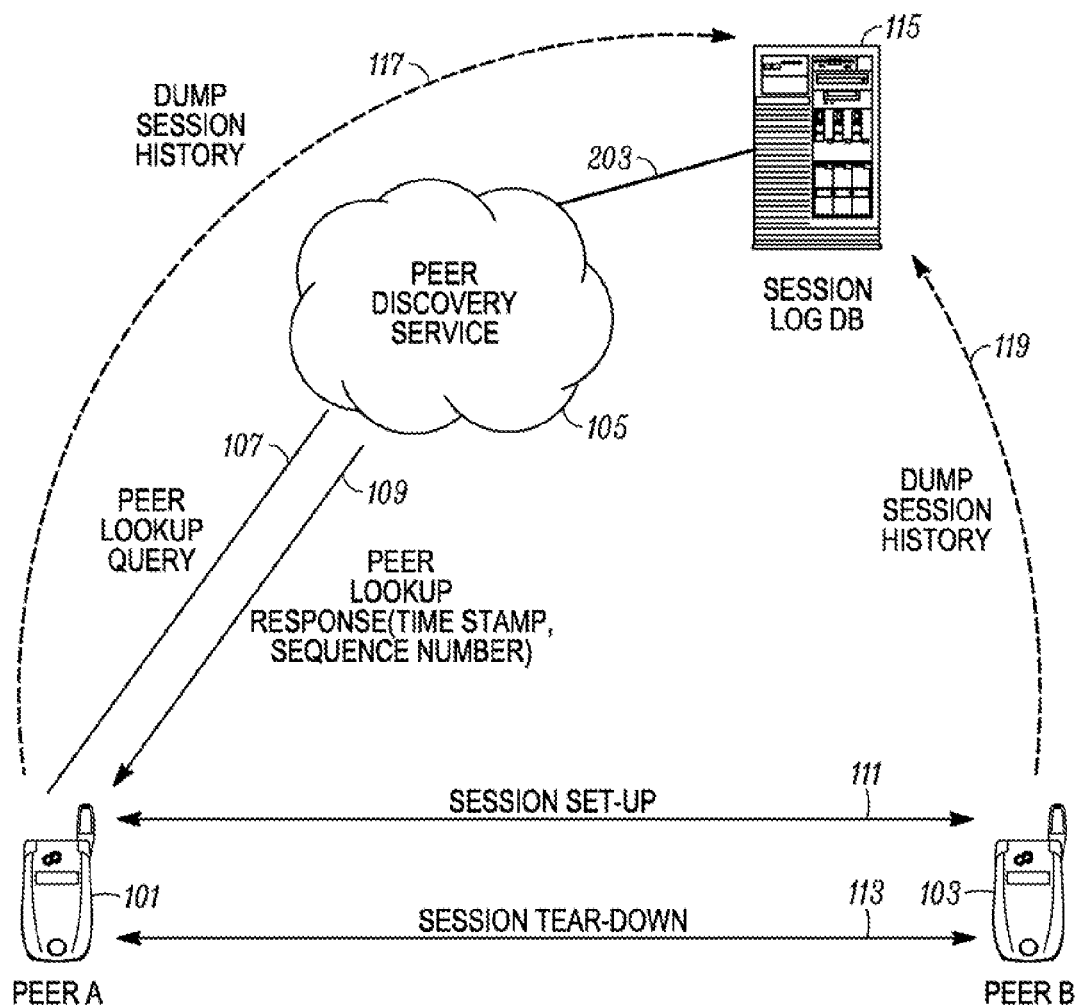
FIG. 1 is a block diagram of a peer-to-peer wireless network in accordance with the various embodiments.

Turning now to the drawings, FIG. 1 illustrates a peer-to-peer wireless network in accordance with various embodiments. Mobile device 101 (Peer-A) and mobile device 103 (Peer-B) are Internet Protocol (IP) peers and communicate over a wireless link using IP including, but not limited to, Voice-Over-IP (VoIP). The wireless link may be any appropriate radio interface, for example, 802.11, 802.16, Bluetooth™, GSM (and/or GPRS, EDGE, etc.), CDMA, UMTS etc. It is to be understood however, that the peer need not be a wireless peer, and may be any peer connected to an IP network via, for example, Digital Subscriber Line (DSL), Dial-up or cable.

In FIG. 1, the Peer-A 101 would like to establish an IP session with Peer-B 103. However, because there is no centralized switch in the various embodiments, Peer-A 101 must acquire reachability information for Peer-B 103 before an IP session can be established. Therefore, Peer-A 101 broadcasts a Peer Lookup Query 107 to a Peer Discovery Service (PDS) 105.

The PDS is a fully distributed, non-centralized, logical entity distributed among each and every peer participating in the network. Thus, any peer may receive the Peer Lookup Query 107, and either forward it on to other peers, or respond if the particular peer has reachability information cached for the requested peer 103. It is to be understood that, Peer-A may sometimes already have the desired reachability information for Peer-B 103 and thus may in some embodiments check locally, that is the memory of Peer-A, for Peer-B 103 reachability information prior to broadcasting the Peer Lookup Query 107. Various other procedures may be employed in accordance with the various embodiments, provided that, Peer-A 101 obtains reachability information for Peer-B 103 such that an IP session between Peer-A 101 and Peer-B 103 may be established. For example, a service provider access control peer may run Network Time Protocol (NTP) and provide an initial timestamp. Further, a peer joining the peer-to-peer network for the first time, and/or otherwise not having any peer addresses cached in memory, may have a bootstrapping peer address either provisioned in its software or discovered using for example and Uniform Resource Locator (URL) and Domain Name Service (DNS). Bootstrap peers may run NTP service and may be synchronized with other service provider peers. However, in the various embodiments, times synchronization is not required between peers participating in IP sessions.

Thus, returning to FIG. 1, Peer-A 101 may receive a Peer Lookup Response 109 from any peer having reachability information for Peer-B 103. In addition to the reachability information, the Peer Lookup Response 109 will contain a Time Stamp, and an Initial Sequence Number. The Time Stamp may in some embodiments be provided by the responding peer's internal clock, and/or may be derived using Network Time Protocol (NTP) in other embodiments.

After Peer-A 101 receives the Peer-B 103 reachability information, Time Stamp and Initial Sequence Number in the Peer Lookup Response 109, it may send a session set-up message 111 to Peer-B 103 and establish an IP session. The session set-up message 111 will also contain a Time Stamp which will be the Initial Time Stamp incremented by Peer-A 101 by any time elapsed during preparation of the session set-up message 111. Peer-A will store at least a message identification including sequence number and timestamp in a local session record contained in a secure memory of Peer-A 101.

Similarly, Peer-B 103 will receive the session set-up message 111 and thus an Initial Time Stamp (plus any elapsed time added by Peer-A). Peer-B will then proceed to add elapsed time to any set-up, and subsequent session data messages sent to Peer-A, and will also store at least a message identification including sequence number and timestamp in a local session record contained in a secure memory of Peer-B 103. If for example, a VoIP telephone call is established between Peer-A 101 and Peer-B 103, then both Peer-A 101 and Peer-B 103 will store call management message IDs, and also data appropriate for measuring a call duration, such as VoIP packet sequence numbers, timestamps, etc.

At completion of the IP session, a tear-down message 113 will be sent by either Peer-A 101 or Peer-B 113 and the session will be terminated. Subsequently, both Peer-A 101 and Peer-B 103 will dump the session records from their respective secure memories to a remote Session Log Database 115, via message 117 and message 119, respectively.

A service provider may then make use of the call histories by consolidating the records from Peer-A 101 and Peer-B 103. The overall call history may then be determined from the temporal and causal relationships between the messages. Therefore, in some cases, several IP peers may participate in a group session. In this case, all peers would dump their stored session records to the remote Session Log BD 115 after termination of the session. Similar to the two-peer session case, the overall session details are determined from the consolidated records, and the temporal and causal relationships between the records.

Figure 2:
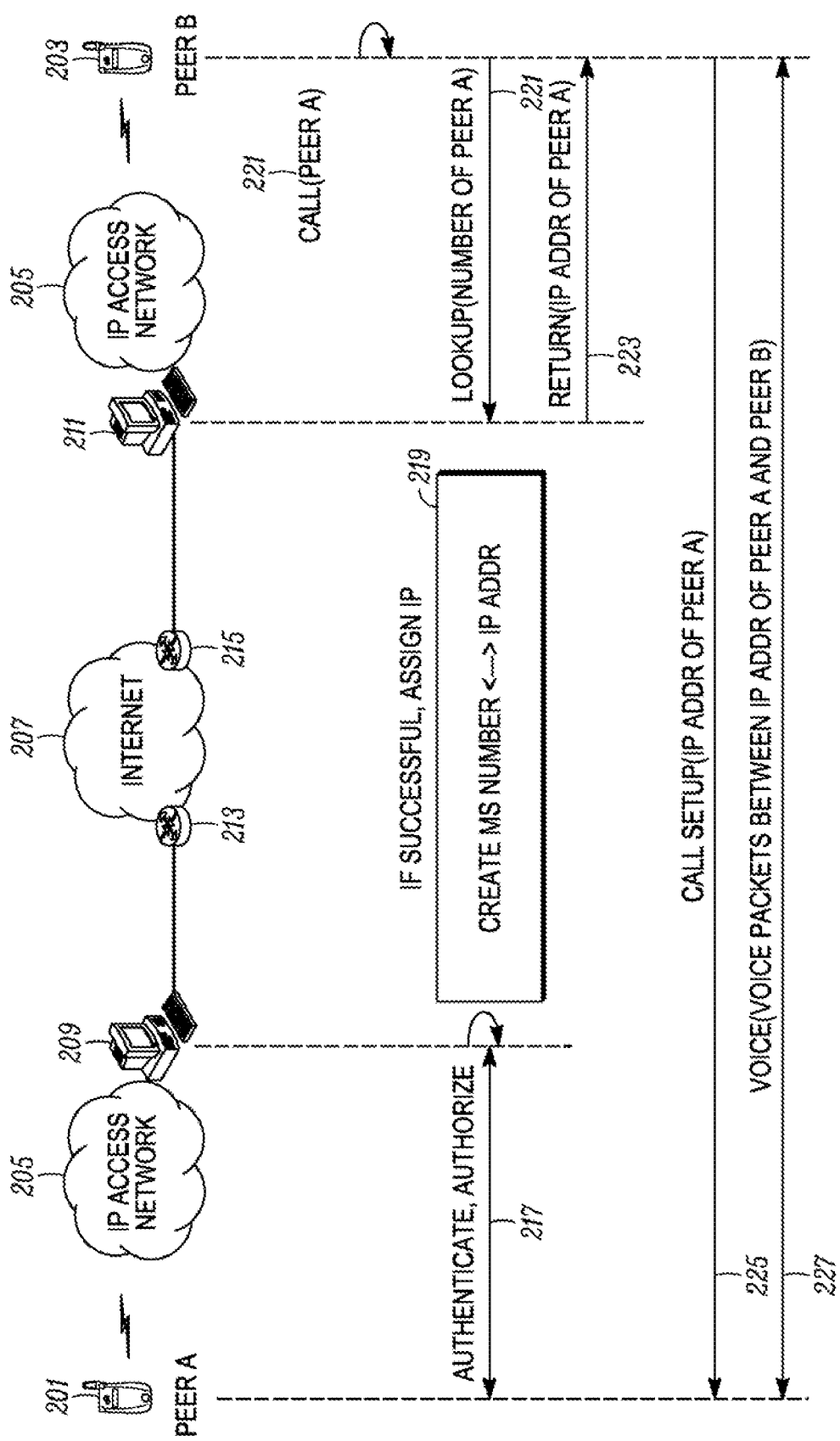
FIG. 2 is a block diagram of telephony in a peer-to-peer wireless network.

FIG. 2 illustrates an example of VoIP telephony in a peer-to-peer wireless network with further details of operation. In FIG. 2, a mobile IP peer, Peer-B 203 wants to establish an IP session, in this example a VoIP telephone call, with Peer-A 201. A service provider provides Peer-A 201 with wireless access via IP access network 205, which as previously discussed may employ any appropriate interface such as, but not limited to, 802.11, 802.16, Bluetooth™, GSM (and/or GPRS, EDGE, etc.), CDMA, UMTS etc. The IP access network 205 may include an Access Control Peer 209 for authenticating Peer-A 201 to the IP Access Network 205. The Access Control Peer 209 may provide PDS functionality. The IP Access Network 205 is connected to the Internet 207 and the connection may pass through various routers 213, 215.

Likewise, Peer-B 203 communicates over the Internet 207 via the IP Access Network 205 and Access Control Peer 211. It is to be understood that Peer-B 203 may communicate using the same IP Access Network 205, as used by Peer-A 201, or may communicate using some other IP Access Network which may be from a provider other than the provider of IP Access Network 205.

It is also to be understood that IP Access Network 205 may have various radio coverage areas which may, or may not be, contiguous coverage areas such that Peer-A 201 and Peer-B 203 may, using the same provider, access IP Access Network 205 from different geographic locations. Thus, returning to FIG. 2, Peer-A 201 may be authenticated to the IP Access Network 205 via authentication message 217, in which case the Access Control Peer 209 may assign an IP address 219 to Peer-A 201.

Peer-B 203, may invoke the Peer Discovery Service (PDS), and query for Peer-A 201 reachability information via lookup query 221. As previously discussed, any network peer may respond, for example Access Control Peer 211, and return the reachability information, such as the IP address for Peer-A 201, via lookup response message 223. In the various embodiments, lookup response message 223 will also provide an Initial Time Stamp and an Initial Sequence Number to Peer-B 203.

Peer-B 203 may then send call setup message 225 over the Internet 207 to Peer-A 201 and, after establishment of the VoIP session, proceed to communicate with Peer-A via voice packets 227. In the various embodiments, both Peer-A 201 and Peer-B 203 will record and store in memory, call management messages (which includes call setup message 225) and voice messages along with Sequence Numbers and Time Stamps corresponding to each message transmitted and received as discussed above with respect to FIG. 1.

Additional information for call trace will also be stored by both Peer-A 201 and Peer-B 203, including, but not limited to, Caller ID information (such as phone number, IP address, subscriber name, address, geographic location, etc.), the number dialed by the respective Peer, total call duration, call time of day, etc.

Figure 3:
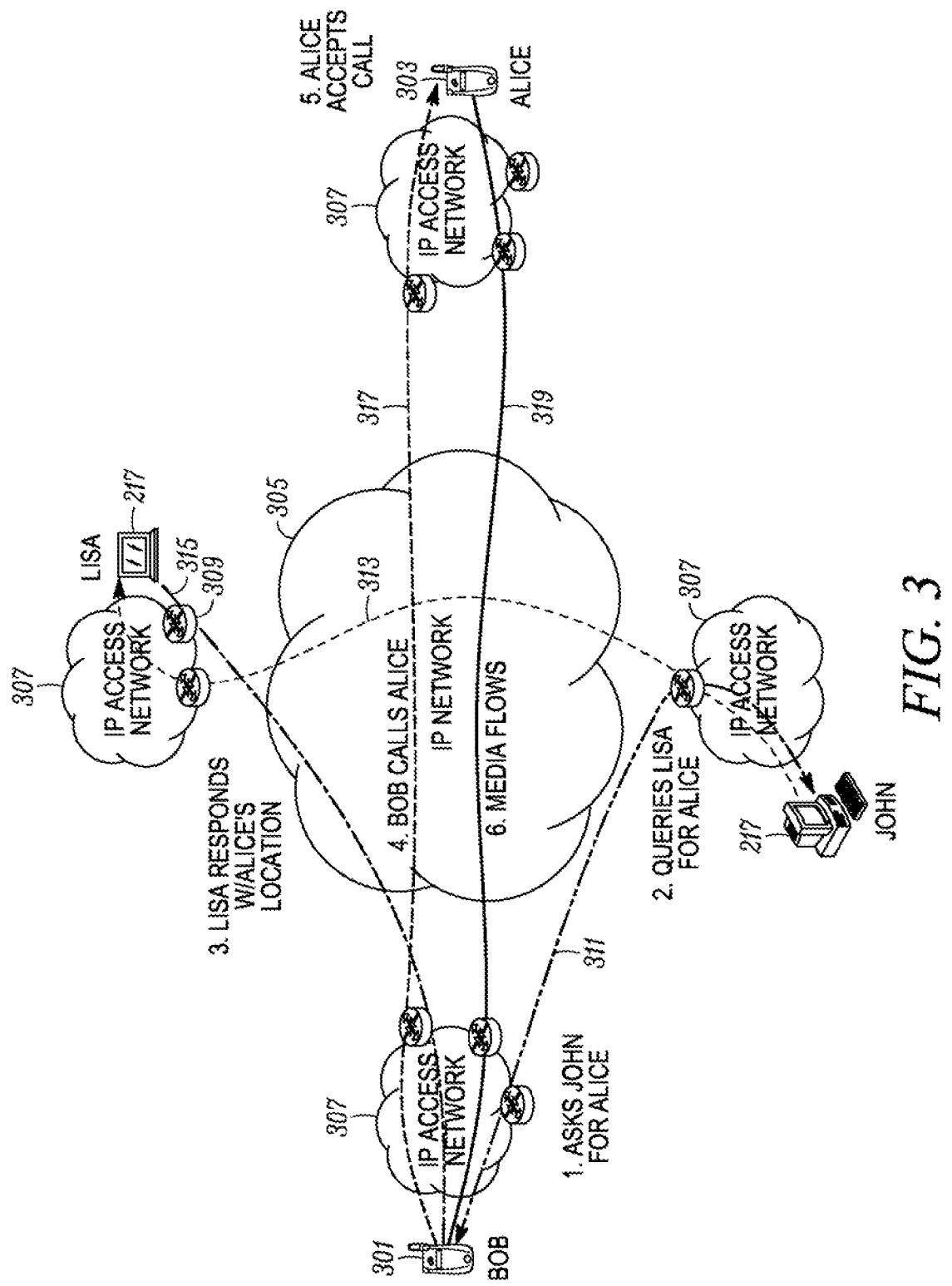
FIG. 3 is a block diagram illustrating peer discovery in a peer-to-peer wireless network

FIG. 3 provides further details of call discovery in peer-to-peer IP networks as applicable to the various embodiments. In the various embodiments, services are created and managed by the cooperating end users, namely, the IP peers. Thus, in the various embodiments there is no centralized control for caller discovery, call routing, or media streams including voice.

Therefore, FIG. 3 provides further illustration of peer discovery in such decentralized networks. Bob 301 wanting to call Alice 303, broadcasts a lookup query 311, over the IP network 305 which may be the Internet, via IP access network 307, which is received by John 217. John 217, not having the reachability information for Alice 303, further queries, or otherwise forwards the query message on, via query message 313 to Lisa 217. If Lisa 217 has the relevant information, Lisa 217 may respond directly to Bob 301 via lookup response 315. Lookup response 315 will include an Initial Time Stamp and an initial Sequence Number as previously discussed. Bob 301 may then use the reachability information, initial Time Stamp and Sequence Number to call, via VoIP, Alice 303 and establish the media flow 319, in this example, VoIP packets.

Figure 4:
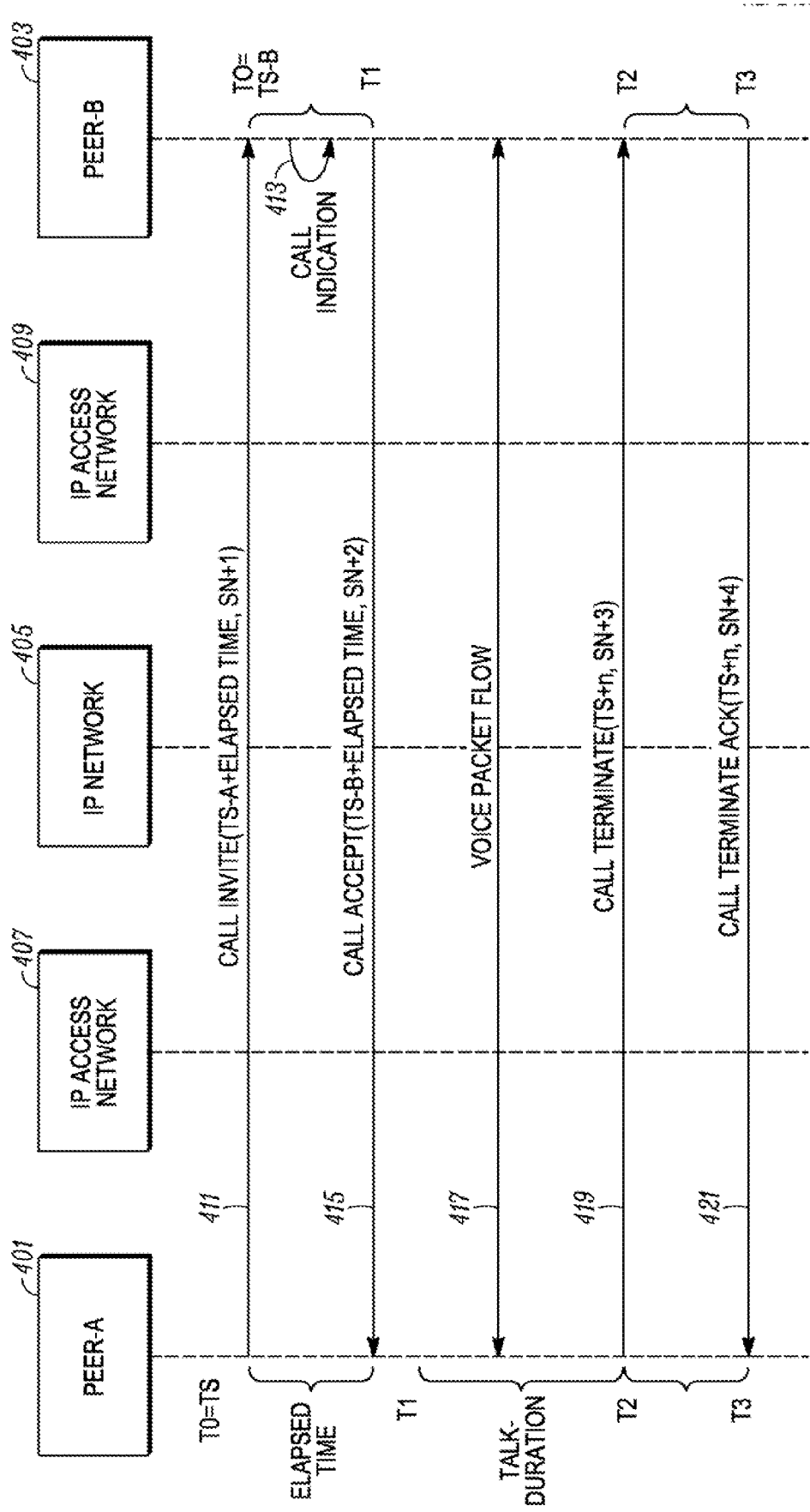
FIG. 4 is a message flow diagram illustrating timestamps and sequence numbers as used in various embodiments.

FIG. 4 is a message flow diagram showing further details of operation, and the use of time stamps and sequence numbers in accordance with the various embodiments. FIG. 4 illustrates message flow between two IP peers, Peer-A 401 and Peer-B 403. However, it is to be understood that in the various embodiments an IP session may be between two or more peers and thus, FIG. 4 is exemplary of two peers communicating for the purpose of understanding the message flow of the various embodiments.

In FIG. 4, it is assumed that Peer-A has already performed a PDS lookup query and thus already has an Initial Time Stamp "T0" and an initial sequence number. Thus, at time T0, Peer-A 401 sends a call invite message 411 using the incremented sequence number "SN+1" and timestamp "TS-A+$\Delta$" where $\Delta$ may represent message processing time, that is, the time T0 plus any time that elapsed while Peer-A 401 was preparing the call invite message 411. Peer-B 403 receives the call invite message, which as previously discussed travels over an IP Access Network 407, an IP network 405 which may be the Internet, and may travel over another IP Access Network 409. Peer-B 403 will thus provide call indication 413 to the user, and then use the received timestamp "TS-A+$\Delta$" as the Peer-B 403 initial timestamp "TS-B." Peer-B 403 will add any elapsed time due to message processing to obtain new time T1, which Peer-B 403 will include in the call accept message 415. Peer-B will also increment the sequence number once again such that the new SN=SN+2.

It is to be understood that if more than two peers are involved in the session, or later join into the session, the called mobile may provide management of the sequence numbers such that, for example, each mobile participating may increment a received SN by some value different than other participants. This way, timestamp, and SN received by any peer may be unique for each participating peer. However, other approaches will be apparent which would likewise remain within the scope of the various embodiments. for example, associating each participating peer ID, timestamp, and SN for each message ID stored etc. provided that a unique session record is created and stored for each session participant, and stored in the local memory of each peer.

Returning to FIG. 4, voice packet flow 417 will then occur and both Peer-A 401 and Peer-B 403 will record talk duration time. The call may then be terminated by call terminate message 419 and call terminate acknowledge message 421. Again, both Peer-A 401 and Peer-B 403 will record message information locally, that is, at least the message type (such as, but not limited to, "call invite," "call terminate," "voice packet," "call accept," etc.), and a timestamp and sequence number for each message.

Both Peer-A 401 and Peer-B 403 will dump their respective session logs to a remote Session Log Database, such as Session Log DB 115 shown in FIG. 1, after termination of the session. Thus, the service provider may use the message IDS, that is, message types, sequence numbers and timestamps, to consolidate the records and determine the overall sequence and time of events via temporal and causal ordering.

For example, a "call accept" message received by Peer-A 401 would require a previous "call invite" message sent by Peer-A 401 to whatever peer the "call accept" was received from. Therefore, a service provider may provide session logging and session tracing without centralized network call management or mobility management and only needs to provide remote Session Log DB storage and associated record processing.

Figure 5:
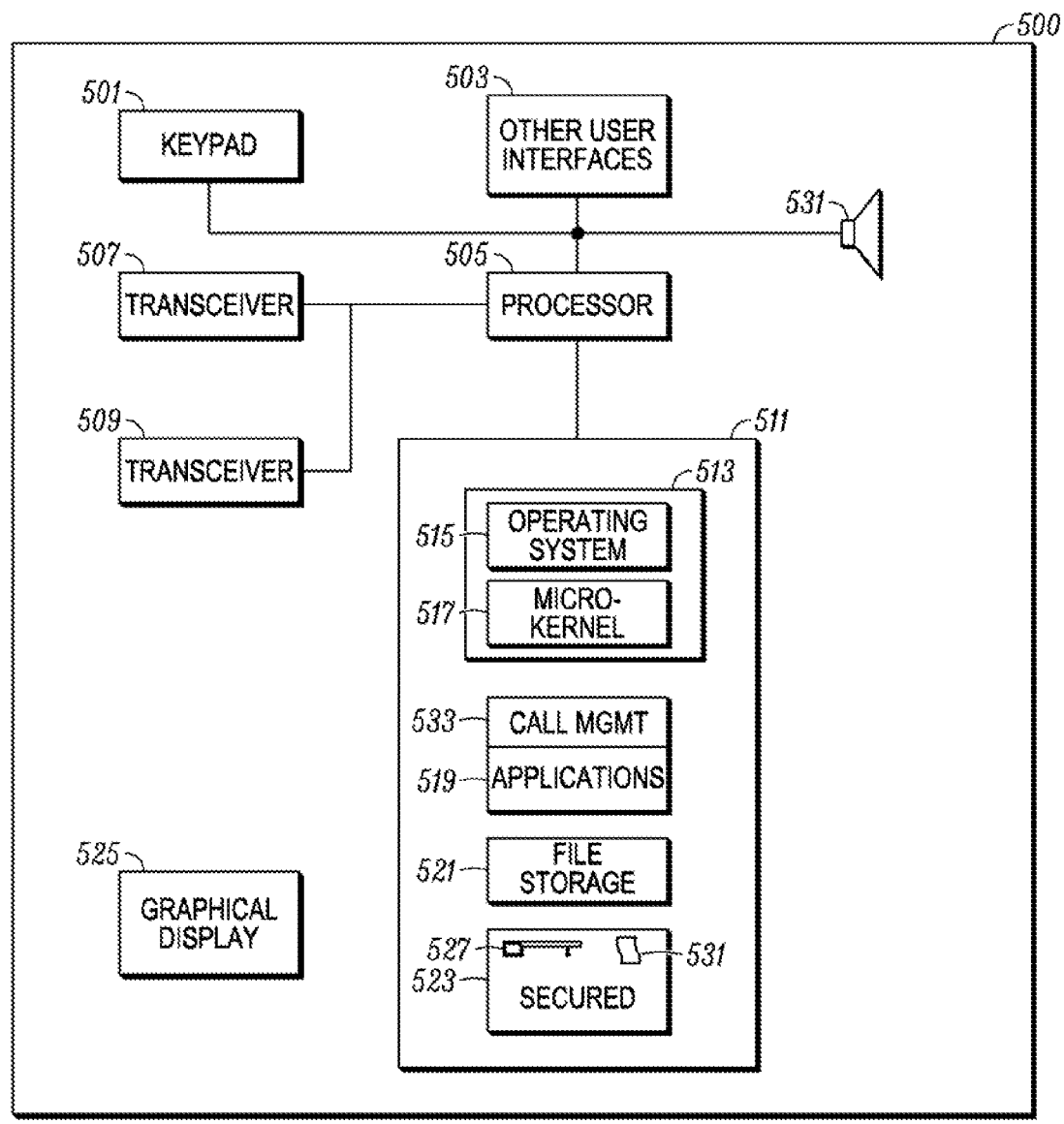
FIG. 5 is a block diagram of a wireless communication device, or wireless mobile peer, in accordance with some embodiments.

FIG. 5 is a block diagram illustrating the primary components of a wireless mobile peer 500 in accordance with some embodiments. Peer 500 comprises a keypad 501, other user interfaces 503, at least one processor 505, and at least one memory 511. Memory 511 has storage sufficient for the peer 500 operating system 513, applications 519 and general file storage 521. The memory 511 may further comprise a secured memory component 523 which may be integrated with memory 511 or may be a physically separate component in some embodiments. The secured memory 523 may store a number of session logs, such as session log 531, and may also have one or more integrity keys 527 and may also store authenticity credentials for verifying the integrity and security of the stored session logs. Further, secured memory 523 may store a number of encryption keys.

Peer 500 user interfaces 503, may be a combination of user interfaces including, but not limited to, a touch screen, voice activated command input, and gyroscopic cursor controls. Peer 500 has a graphical display 525, which may also have a dedicated processor and/or memory, drivers etc. which are not shown in FIG. 5. Peer 500 further comprises audio speaker 531 and a microphone (not shown).

It is to be understood that FIG. 5 is for illustrative purposes only and is for illustrating the main components of a peer 500 in accordance with the present disclosure, and is not intended to be a complete schematic diagram of the various components and connections therebetween required for a peer 500.

Therefore, a peer 500 may comprise various other components not shown in FIG. 5 and still be within the scope of the present disclosure.

Returning to FIG. 5, the peer 500 may also comprise a number of transceivers such as transceivers 507 and 509. Transceivers 507 and 509 may be for communicating with various wireless networks using various interfaces such as, but not limited to, GSM (and/or GPRS, EDGE, etc.), IS-95 CDMA, UMTS, CDMA2000, 802.11, 802.16, Bluetooth™, etc.

Memory 511 is for illustrative purposes only and may be configured in a variety of ways and still remain within the scope of the present disclosure. For example, memory 511 may be comprised of several elements each coupled to the processor 505. Further, separate processors and memory elements may be dedicated to specific tasks such as rendering graphical images upon a graphical display, or for providing operating system security and data integrity. In any case, the memory 511 will have at least the functions of providing storage for an operating system 513, applications 519 and general file storage 521, and session log 531, for peer 500. Application 519, comprise at least a call management module 533.

In some embodiments, operating system 513 may comprise a kernel or micro-kernel 517 which supports additional operating system 515. For example, operating system 515 may be Linux and micro-kernel 517 may be L4 in some embodiments. In any event, for the embodiments having micro-kernel 517, the micro-kernel 517 provides a root mode, or supervisory mode, wherein higher order software such as operating system 515, or segments of operating system 515, and applications 519, or portions of applications 519 may be removed leaving operating capabilities provided by micro-kernel 517 in tact. Thus further, secured memory 523 will not be accessible by tampering with, or otherwise modifying, applications 519 so that the integrity of session log 531 will be maintained.

Figure 6:
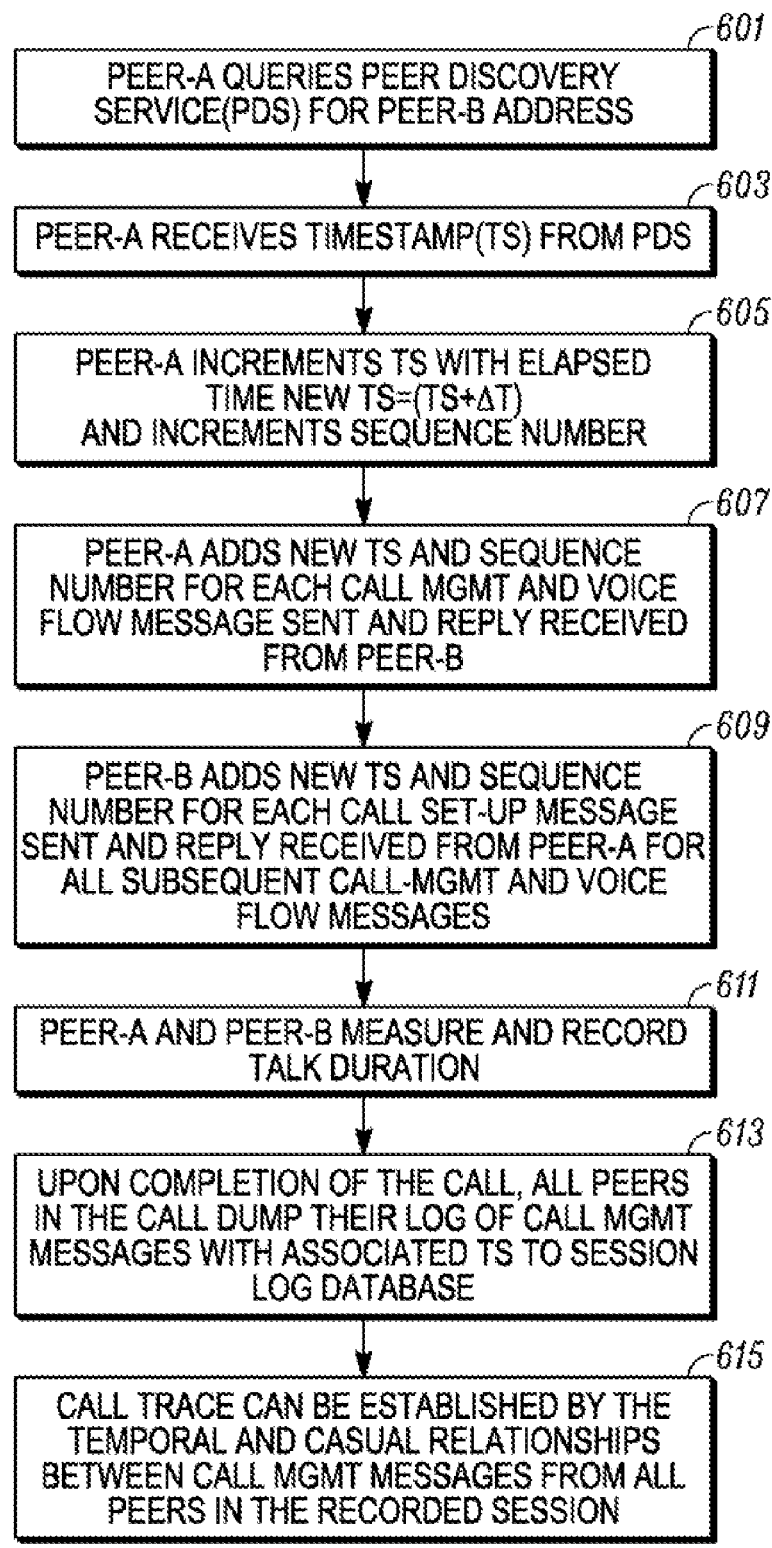
FIG. 6 is a flow chart illustrating creation of session records for billing and call tracing in accordance with an embodiment.

The flow chart of FIG. 6 illustrates creation of the session log records for billing and session tracing in accordance with an embodiment. Thus in 601, Peer-A queries a PDS for Peer-B's IP address. In 603, Peer-A receives a response from the PDS including an initial timestamp (TS) and an initial sequence number. In 605, Peer-A adds elapsed time and increments the sequence number, and establishes an IP session such as, but not limited to, a VoIP phone call. For every subsequent sent session or call management message, and voice flow message if applicable, Peer-A will add a new TS and SN.

As shown in 609, Peer-B will reciprocally perform the same action. In 611, both Peer-A and Peer-B record talk duration (for IP calls) or otherwise session duration and store the records in local memory session logs.

Upon completion of the IP session, all peers dump their local session log to a remote session log database as shown in 613. As in 616, call trace can be established by using the temporal and causal relationships between all recorded messages from all participating peers.

Figure 7:
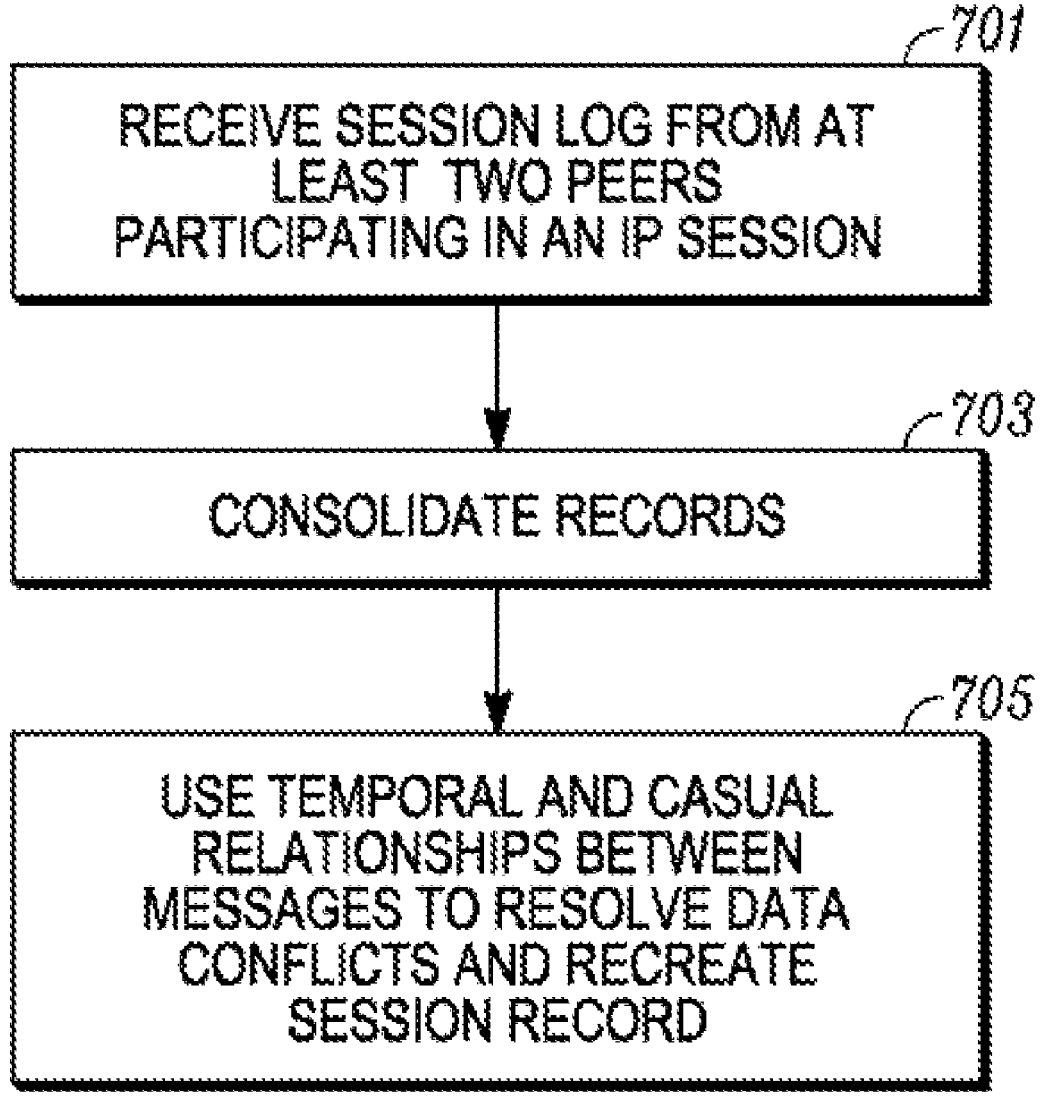
FIG. 7 is a flow chart illustrating completion of session records by a remote session log database in accordance with an embodiment.

FIG. 7 illustrates usage of the individual peer session logs by a remote session log database in accordance with an embodiment. In 701, the remote session DB receives session logs from at least two peers participating in an IP session that has recently terminated. The remote session DB consolidates the records in 703 and uses the temporal and causal relationships between the messages to resolve any data conflicts and recreate the complete session record.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of creating a billing record for a first wireless mobile peer in a peer-to-peer wireless network, the method comprising:
    sending, by said first wireless mobile peer, a peer lookup query over said peer-to-peer wireless network;
    receiving in response to said peer lookup query, a data packet comprising an initial timestamp and an initial packet sequence number;
    establishing an Internet Protocol session in response to receiving said data packet;
    adding by said first wireless mobile peer, elapsed time to said initial timestamp and an incremented packet sequence number to transmitted data packets;
    recording a time duration for said Internet Protocol communication session, based on said initial timestamp and said elapsed time for said transmitted data packets to a local session log;
    completing said Internet Protocol session; and
    transferring, over said peer-to-peer wireless network, said local session log to a remote session log database.

2. The method of claim 1, wherein recording a time duration for said Internet Protocol communication session to a local session log further comprises:
    storing said local session log to a secure memory of said first wireless mobile peer.

3. The method of claim 1, wherein adding by said first wireless mobile peer, elapsed time to said initial timestamp and an incremented packet sequence number to transmitted data packets, further comprises:
    adding elapsed time to a call management message between said first wireless mobile peer and a second wireless mobile peer; and
    measuring talk time duration based on voice packets transmitted from and received by said first wireless mobile peer.

4. The method of claim 1, wherein sending, by said first wireless mobile peer, an Internet Protocol communication session request, to said second wireless mobile peer, over said peer-to-peer wireless network, further comprises:
    sending a Session Initiation Protocol (SIP) invite message.

5. The method of claim 1, wherein recording, by said first wireless mobile peer, in a secure memory of said first wireless mobile peer, each transmitted and received call management message including an associated time stamp to a first session log, further comprises:
    recording information received from said second wireless mobile peer including caller identification information of said second wireless mobile peer;
    and wherein recording, by said second wireless mobile peer, in a secure memory of said second wireless mobile peer, each transmitted and received call management message including an associated time stamp to a second session log; further comprises:
    recording information received from said first wireless mobile peer including caller identification information of said first wireless mobile peer.

6. The method of claim 1, wherein sending, by said first wireless mobile peer, an Internet Protocol communication session request, to said second wireless mobile peer, over said peer-to-peer wireless network, further comprises:
    accessing a Peer Discover Service;
    performing a peer lookup query for said second wireless mobile peer; and
    receiving a peer lookup response for said second wireless mobile peer.

7. The method of claim 6, wherein receiving in response to said session request, a data packet comprising an initial timestamp and an initial packet sequence number further comprises:
    receiving said initial timestamp and said initial packet sequence number in said peer lookup response.

8. The method of claim 1, wherein receiving in response to said session request, a data packet comprising an initial timestamp and an initial packet sequence number further comprises:
    receiving said initial timestamp and said initial packet sequence number from said remote session log database.

9. A method of creating a billing record for a first wireless mobile peer, and a second wireless mobile peer, in a peer-to-peer wireless network, the method comprising:
    sending, by said first wireless mobile peer, an Internet Protocol communication session request, to said second wireless mobile peer, over said peer-to-peer wireless network;
    receiving in response to said session request, a data packet comprising an initial timestamp and an initial packet sequence number;
    establishing an Internet Protocol session between said first wireless mobile peer and said second wireless mobile peer in response to receiving said data packet by said first wireless mobile peer;
    adding by said first wireless mobile peer, elapsed time to said initial timestamp and an incremented packet sequence number to a call set-up message transmitted in a data packet to said second wireless mobile peer;
    recording, by said first wireless mobile peer, in a secure memory of said first wireless mobile peer, each transmitted and received call management message including an associated time stamp to a first session log;
    recording, by said second wireless mobile peer, in a secure memory of said second wireless mobile peer, each transmitted and received call management message including an associated time stamp to a second session log;
    completing said Internet Protocol session; and
    transferring, over said peer-to-peer wireless network, said first session log and said second session log to a remote session log database.

10. A wireless communication station comprising:
    a transceiver configured to send and receive data over a peer-to-peer wireless network;
    a processor coupled to said transceiver; said processor configured to:
        send, via said transceiver, an Internet Protocol communication session request over said peer-to-peer wireless network;
        receive, via said transceiver, in response to said session request, a data packet comprising an initial timestamp and an initial packet sequence number;
        establish an Internet Protocol session in response to receiving said data packet;
        add elapsed time to said initial timestamp and an incremented packet sequence number to transmitted data packets;
        record a time duration for said Internet Protocol communication session, based on said initial timestamp and said elapsed time for said transmitted data packets to a local session log;
        complete said Internet Protocol session; and transfer, via said transceiver, over said peer-to-peer wireless network, said local session log to a remote session log database.

11. The wireless communication station of claim 10, further comprising:

a secured memory component coupled to said processor and configured to store said local session log.

12. The wireless communication station of claim 10, wherein said processor further comprises a call management component and wherein said processor is further configured to:

add elapsed time to a call management message;

send, via said transceiver, said call management message; and measure talk time duration based on voice packets transmitted from and received by said transceiver.

13. The wireless communication station of claim 10, wherein said processor is further configured to:

access a Peer Discover Service;

perform a peer lookup query for a wireless mobile peer; and receive a peer lookup response for said wireless mobile peer.

14. The wireless communication station of claim 10, wherein said processor is further configured to:

receive, via said transceiver, said initial timestamp and said initial packet sequence number from said peer lookup response.

15. The wireless communication station of claim 10, wherein said transceiver is configured to communicate using one of Bluetooth, 802.11, 802.16, GSM GPRS, EDGE, CDMA, or UMTS.

* * * * *